United States Patent
Greenberger et al.

(10) Patent No.: US 10,833,913 B2
(45) Date of Patent: Nov. 10, 2020

(54) SUPPRESSION OF COMMERCE NOTIFICATIONS BASED ON USER ACTIVITY

(71) Applicant: International Business Machines Corporation, Armonk, NY (US)

(72) Inventors: Jeremy A. Greenberger, San Jose, CA (US); Zachary M. Greenberger, Raleigh, NC (US); Ciaran E. Hannigan, Morrisville, NC (US); Matthew J. Margolis, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 15/802,553

(22) Filed: Nov. 3, 2017

(65) Prior Publication Data

US 2019/0140883 A1    May 9, 2019

(51) Int. Cl.
```
G06Q 30/02      (2012.01)
H04W 68/00      (2009.01)
H04L 29/06      (2006.01)
H04L 12/58      (2006.01)
H04L 29/08      (2006.01)
```
(Continued)

(52) U.S. Cl.
CPC .......... *H04L 29/06* (2013.01); *G06F 16/2358* (2019.01); *G06F 16/909* (2019.01); *G06Q 30/02* (2013.01); *H04L 51/14* (2013.01); *H04L 51/24* (2013.01); *H04L 67/2804* (2013.01); *G06F 16/215* (2019.01); *H04L 51/20* (2013.01);

(Continued)

(58) Field of Classification Search
CPC ......... H04L 29/06; H04L 51/14; H04L 51/24; H04L 67/2804; H04L 51/20; H04L 67/18; H04L 67/2852; G06F 16/909; G06F 16/2358; G06F 16/215; G06Q 30/02; G06Q 30/0261; H04W 4/33; H04W 4/021
See application file for complete search history.

(56) References Cited

U.S. PATENT DOCUMENTS

| | | | |
|---|---|---|---|
| 7,096,391 B2 | 8/2006 | Johnson | |
| 9,690,820 B1 | 6/2017 | Girulat, Jr. | |

(Continued)

FOREIGN PATENT DOCUMENTS

EP    2698016 A1    2/2014

*Primary Examiner* — Vincent M Cao
(74) *Attorney, Agent, or Firm* — Stephanie Carusillo; Maxine L. Barasch; Keohane & D'Alessandro, PLLC

(57) ABSTRACT

Disclosed embodiments provide techniques for suppression of commerce notifications based on user activity. In embodiments, the user activity is an activity such as an acknowledgement via an application on an electronic mobile computing device that is associated with the user. A first message is sent including information regarding offers and/or sales at a venue. The user may, at that time, interact with the information by pressing a button or activating a link to obtain more information. That interaction is recorded and used as criteria for sending or suppressing a second message. Alternatively, the second message may be modified. The modification can include rewording the first message as a reminder, and/or removal of audio and/or vibration alerts for the second message. These features promote a user experience in which the user is aware of a sale or promotion and the in-store experience remains positive.

18 Claims, 8 Drawing Sheets

(51) Int. Cl.
  *G06F 16/23* (2019.01)
  *G06F 16/909* (2019.01)
  *G06F 16/215* (2019.01)
  *H04W 4/021* (2018.01)
  *H04W 4/33* (2018.01)

(52) U.S. Cl.
  CPC .......... *H04L 67/18* (2013.01); *H04L 67/2852* (2013.01); *H04W 4/021* (2013.01); *H04W 4/33* (2018.02)

(56) References Cited

U.S. PATENT DOCUMENTS

| | | | |
|---|---|---|---|
| 2011/0213670 A1* | 9/2011 | Strutton | G06Q 30/0277 705/14.73 |
| 2012/0258691 A1* | 10/2012 | Baer | H04M 1/72563 455/412.2 |
| 2013/0211888 A1* | 8/2013 | Alwan | G06Q 30/0277 705/14.7 |
| 2014/0180817 A1* | 6/2014 | Zilkha | G06Q 30/02 705/14.55 |
| 2014/0195620 A1 | 7/2014 | Srinivasan et al. | |
| 2015/0019654 A1 | 1/2015 | Wheeler et al. | |
| 2017/0244798 A1* | 8/2017 | DeLuca | H04W 4/14 |
| 2017/0324695 A1* | 11/2017 | Fischer | H04L 51/24 |

\* cited by examiner

SUPPRESSION OF COMMERCE NOTIFICATIONS BASED ON USER ACTIVITY

FIELD OF THE INVENTION

Embodiments of the invention relate to systems and methods for suppression of commerce notifications based on user activity.

BACKGROUND

A common method of advertising is to send a notification including an advertisement to, and display on the screen of, a user's electronic device, such as a mobile phone or tablet. The advertisement may indicate a new product, a sale on a product, or any other suitable information. In order to keep the information of the advertisement at the top of the mind for the consumer, the message may be sent more than once. Receiving a multitude of instances of the same messages during a short period of time may create annoyance or frustration to the receiving consumer. Accordingly, there exists a need for improvements in electronic commerce notification technology.

SUMMARY

In one embodiment, there is provided a computer-implemented method for sending notifications to an electronic device comprising: sending a first message at a first time, wherein the first message is received by the electronic device; responsive to receiving the first message, starting a timer; detecting a location of the electronic device; responsive to detecting the location as a venue associated with the first message, and responsive to the timer being expired, sending a second message to the electronic device.

In another embodiment, there is provided an electronic communication device comprising: a processor; a memory coupled to the processor, the memory containing instructions, that when executed by the processor, perform the steps of: sending a first message at a first time, wherein the first message is received by a mobile electronic device; responsive to sending the first message, starting a timer; detecting a location of the mobile electronic device; responsive to detecting the location as a venue associated with the first message, and responsive to the timer being expired, sending a second message to the mobile electronic device.

In yet another embodiment, there is provided a computer program product for sending notifications for an electronic computing device comprising a computer readable storage medium having program instructions embodied therewith, the program instructions executable by a processor to cause the electronic computing device to: send a first message at a first time, wherein the first message solicits a user response; responsive to receiving a user response, start a timer; detect a location of a mobile electronic device; responsive to detecting the location as a venue associated with the first message, and responsive to the timer being expired, send a second message to the mobile electronic device.

BRIEF DESCRIPTION OF THE DRAWINGS

Features of the disclosed embodiments will be more readily understood from the following detailed description of the various aspects of the invention taken in conjunction with the accompanying drawings.

Figure 1:
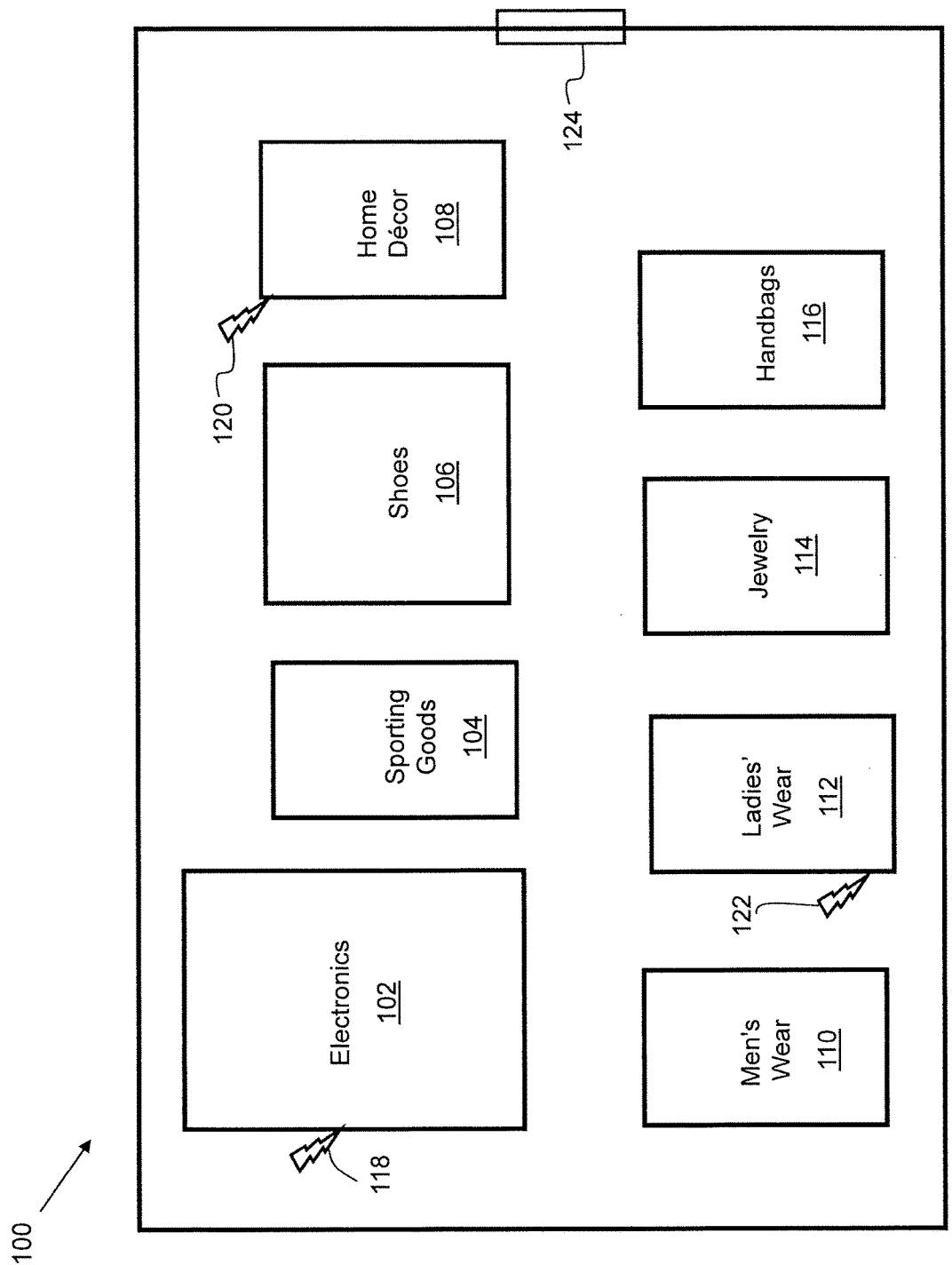
FIG. 1 shows an exemplary venue.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for suppression of commerce notifications based on user activity. In embodiments, the user activity is an activity such as an acknowledgement via an application (app) on an electronic mobile computing device that is associated with the user. Notifications of sales and special offers/promotions can be helpful, but after a user is notified of the offer/promotion multiple times, a user may find it to be annoying, and the overuse of such notifications can even cause a user to uninstall the application from their mobile device. Disclosed embodiments utilize in-app interactions to suppress notifications sent from a marketing service. This promotes a user experience in which the user is aware of a sale or promotion and the in-store experience remains positive, while reducing the risk of a user becoming inundated with notifications and annoyed.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 shows an exemplary venue. Typically, the venue is an indoor venue such as a retail establishment. Venue 100 is a department store including various departments indicated by reference numbers 102-116. An Indoor Positioning System (IPS) allows a mobile device to determine its position within the venue. In embodiments, multiple wireless transmitters 118, 120, and 122 are positioned within venue 100. The wireless transmitters may be RF beacons, WiFi transmitters, Bluetooth® transmitters, or other suitable protocol. When a user enters the store at entrance 124, his/her mobile device makes a location assessment within the venue by use of the wireless transmitters. The location assessment may be accomplished by triangulation, beacon proximity, or other suitable location determination technique. In some embodiments, triangulation may occur using transmitters that are located outside of the venue. For example, in some embodiments, triangulation may occur using local radio station transmitters that are within range of the venue, such as local FM or AM radio stations. Embodiments may include assessing signal strength and additionally performing a station identification using frequency and/or an SSID (service set identifier) or other identifier to make a location assessment. In some embodiments, an inertial navigation system may be used to determine location within the venue 100. In some embodiments, an optical system may be used to determine location within the venue 100. Thus, in some embodiments, a location assessment may be made without the use of transmitters. The location assessment may be that the user has entered the venue. In other embodiments, the location assessment may include zones where a customer visited. For example, it may be desirable to know that a particular customer visited Ladies' Wear 112, followed by Handbags 116, followed by Shoes 106. By understanding the habits and preferences of individual customers, custom-tailored commerce notifications, including messages and coupons, can be offered to those customers that are likely to be relevant for them. Note that while venue 100 is a retail establishment, embodiments of the present invention may be utilized in other venues such as hospitals, airports, train stations, and office buildings, to name a few. While typically the venue may be an indoor venue, embodiments may also include venues that are outdoors, or partially outdoors, such as a hotel resort.

Figure 2:
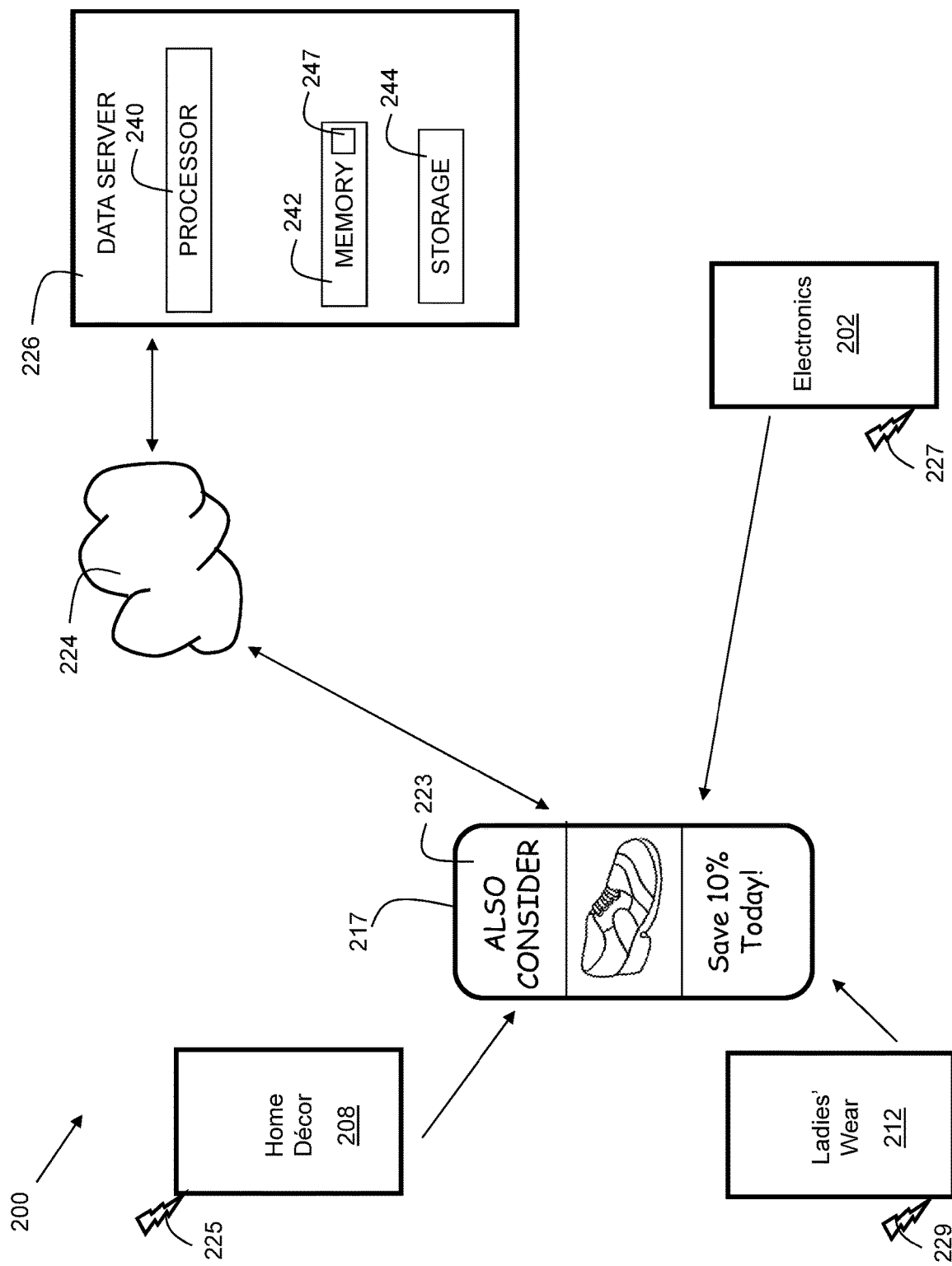
FIG. 2 is a block diagram of a system in accordance with embodiments of the present invention.

FIG. 2 is a block diagram 200 of a system in accordance with embodiments of the present invention. During use, a user brings a mobile electronic device 217 into a venue (such as 100 of FIG. 1) where it receives wireless signals from transmitters 225, 227, and 229 to make a location determination. In some embodiments, the location determination may be an indication that the user has entered the venue. In some embodiments, the location determination may be a zone-based determination. For example, the location determination may determine that the user is in the Ladies' Wear department 212, Home Décor department 208, or Electronics department 202. It may not be necessary to resolve the location to a precise location beyond that zone determination. A detection of the user entering the store by the transmitters, or a geofence may suffice. The mobile electronic device 217 communicates via network 224 to a data server 226, allowing the mobile electronic device 217 to receive and render commerce message 223. Data server 226 is an electronic communication device that can communicate with one or more mobile electronic devices (such as smartphones and tablet computers). The network 224 may be the Internet, a wide area network (WAN), a local area network (LAN), cloud network, any combination thereof, or any other suitable network. The data server 226 may include a processor 240, memory 242, and storage 244. The processor 240 is coupled to the memory 242 such that it can access instructions 247 stored in memory 242. The processor 240 executes the instructions in implementation of embodiments of the present invention. The storage 244 may include one or more hard disks, or other suitable storage technology. Note that while one data server is illustrated in diagram 200, in practice, there may be multiple data servers 226 operating in a distributed manner for load balancing and data redundancy. In embodiments, data servers 226 may implement an object store system utilizing a cloud-based architecture.

The mobile electronic device 217 transmits location information via network 224 to the data server 226. The location information may include a zone and a user identifier. For example, the zone may indicate the user is in the Ladies' Wear department 212. This unique identifier may be an Ethernet MAC address, a Bluetooth address, or a UUID (from a Bluetooth Low Energy beacon), etc.

Figure 3:
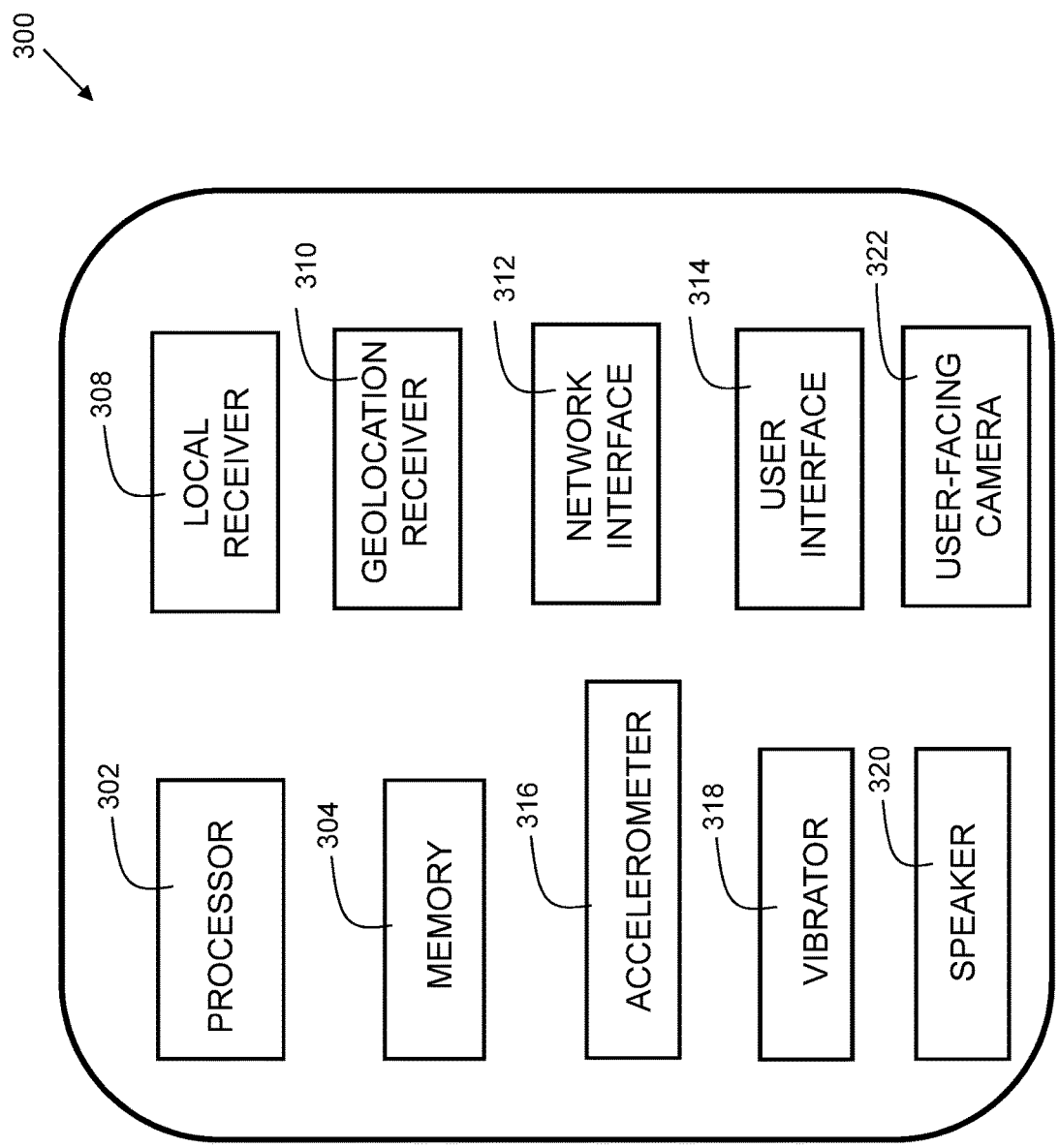
FIG. 3 is a block diagram of a mobile device used in embodiments of the present invention.

FIG. 3 is a block diagram of a mobile device 300 used in embodiments of the present invention. The mobile device 300 includes a processor 302, which is coupled to memory 304. Memory 304 contains instructions, that when executed by the processor 302, perform the various methods in accordance with illustrative embodiments. Mobile device 300 may further include a local receiver 308. The local receiver 308 includes a receiver for local radio frequency (RF) signals. In embodiments, the local receiver may include a Bluetooth® receiver, ZigBee® receiver, or other near field communication (NFC) receiver. Mobile device 300 further may include a geolocation receiver 310. The geolocation receiver may be configured to receive signals from multiple satellites to triangulate a position on Earth. In embodiments, the geolocation receiver 310 includes a Global Positioning System (GPS) receiver, GLONASS receiver, Galileo receiver, or other satellite-based positioning system. The mobile device 300 further includes a network interface 312. Network interface 312 may include a cellular network interface, a WiFi interface, such as an IEEE 802.11 interface, or other suitable network interface. Mobile device 300 may further include a user interface 314. User interface 314 may include a touchscreen, which provides a user with the ability to enter information as necessary to utilize embodiments of the present invention. The mobile device 300 may further include an accelerometer 316, which may be used to detect motion of the mobile device, and may serve in the role of location assessment using inertial navigation techniques. The mobile device 300 may yet further include a vibrator 318, such as a coin vibrator for providing tactile notifications. The mobile device 300 may yet further include a speaker 320 for providing audible notifications. Still yet, the mobile device may include a user-facing camera 322. In some embodiments, mobile device 300 may be a smart phone or tablet computer. The mobile device 300 may be any suitable electronic device.

Figure 4:
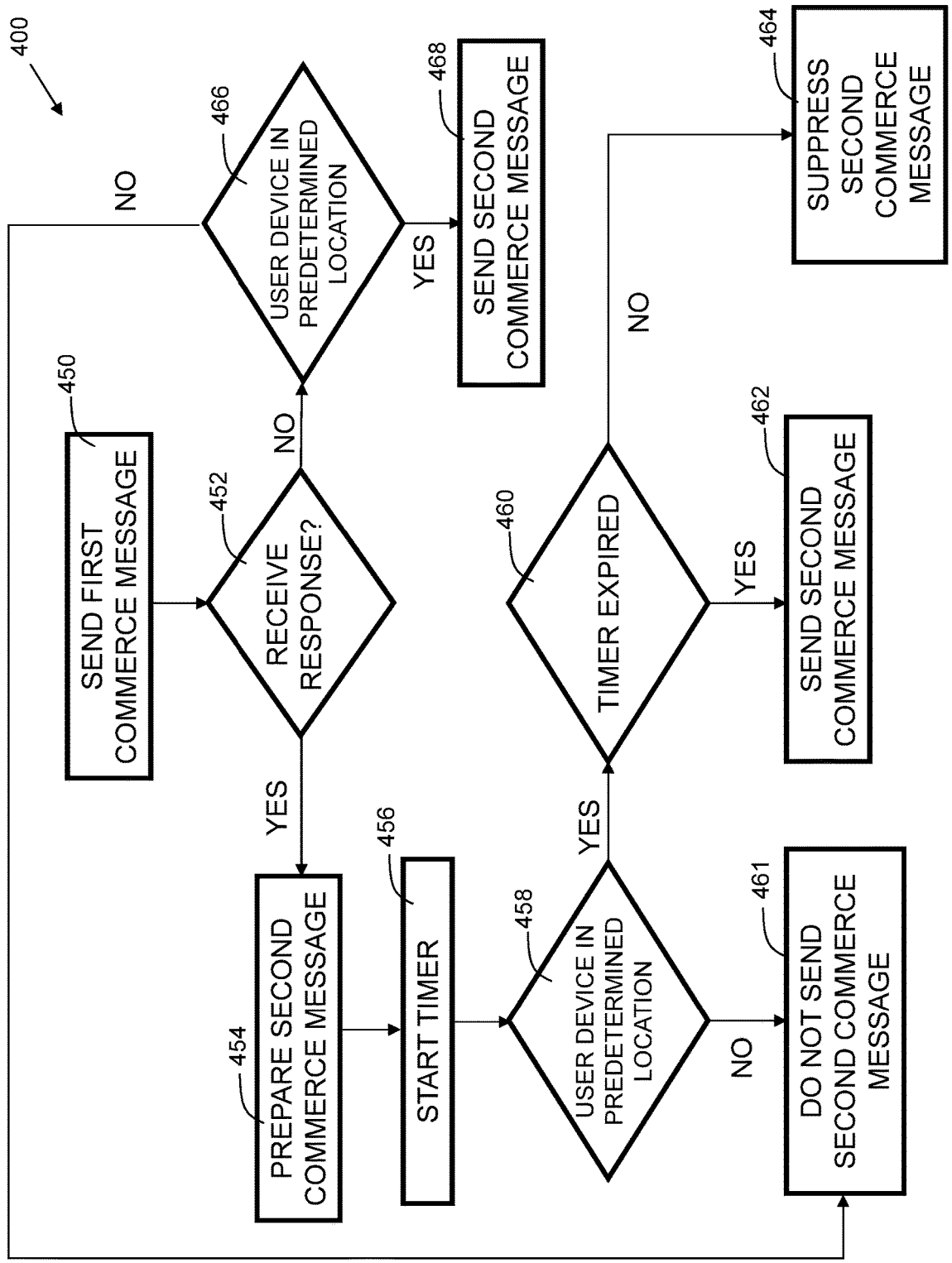
FIG. 4 shows a flowchart in accordance with embodiments of the present invention.

FIG. 4 shows a flowchart 400 in accordance with embodiments of the present invention. At 450, a first commerce message is sent at a first time to an electronic device (e.g., device 300 of FIG. 3). In embodiments, the first commerce message has an assertive tone and solicits a user response. The response may be solicited via a textual question and an interface by which the user can respond, such as at least one electronic button. Any suitable mechanism for solicitation and interface for response is included within the scope of embodiments of the invention. At 452, it is determined whether the user response is received. If at 452, the answer is yes, a second commerce message is prepared at 454. Note that the preparation at this point is optional, and it can instead be performed later in the process in some embodiments. In some embodiments, the sending of the second commerce message comprises sending message content identical to the first commerce message. In some embodiments, the sending of the second commerce message comprises sending message content modified based on the first commerce message. For example, the content of the second message may be based on the first message but presented in different wording. This may include the first commerce message including a sale notice, and the second commerce message including a sale reminder. This may include the sale notice having an assertive tone and sentiment, and the sale reminder having a passive tone and sentiment. In embodiments, computerized natural language processing may be used to derive the second commerce message from the first commerce message.

"Assertive tone and sentiment" and "passive tone and sentiment" may be delineated through any suitable mechanism. For example, calls to action, such as "Stop in now!" and "Everything must go!" may be tagged as an assertive tone. Messages assembled as reminders may be tagged as passive tone, such as "Reminder—Shoes on sale today" or "This is a courtesy to remind you to stop by to check out the jewelry department tomorrow." Messages assembled with exclamation points may be tagged as having an assertive sentiment, and messages ending in periods may be tagged as a passive sentiment. These are examples, and all mechanisms are included within the scope of the invention. Over time, disclosed embodiments may learn via machine learning or artificial intelligence which words, symbols, images, etc., are of an assertive tone and sentiment and which are of a passive tone and sentiment. In embodiments, the machine learning and/or artificial intelligence can be used to automatically generate a second commerce message of a different tone/sentiment than the first commerce message.

At 456, a timer having a predetermined expiry duration is started. In some embodiments, the timer has an expiry duration of three days (72 hours). In some embodiments, the timer has an expiry duration of five days (120 hours). These are examples, and the expiry duration may be any suitable time period. While active, the timer counts down the expiry period to zero, at which point the timer would be expired. At 458, it is determined whether the electronic device is in a predetermined location. The predetermined location may be the venue (100 of FIG. 1), i.e., a store or mall, etc., or a zone within it, such as a department of a department store. If not, at 461, the second message is not sent. The predetermined location may be demarcated by a geofence. The geofence may be implemented by beacon transmitters, satellite-based positioning systems, or other suitable technology. If, instead, the electronic device is at the predetermined location, at 460, it is determined whether the timer has expired. If yes, at 462, the second commerce message is sent to the electronic device as a reminder to the user. If not, at 464, responsive to the timer being active, the second commerce message to the electronic device is suppressed.

If at 452, the answer is no, at 466, it is determined whether the electronic device is within the predetermined location. If yes, at 468, a second commerce message is prepared and sent to the electronic device. The user may not have seen the original message, so s/he can be reminded at this point. In this case, considering that the user may not have seen the original message, the second commerce message may be equivalent to the first commerce message. If no, at 461, the second commerce message is not sent. If the user did not respond to the first commerce message, and did not go to the venue, the user may be disinterested. After some predetermined period of time, the process may begin again with the re-sending of a first commerce message.

In some embodiments, more or fewer steps may be included where feasible. In some embodiments, the steps may be performed in a different order where feasible. All such configurations are included within the scope of the invention.

Figure 5:
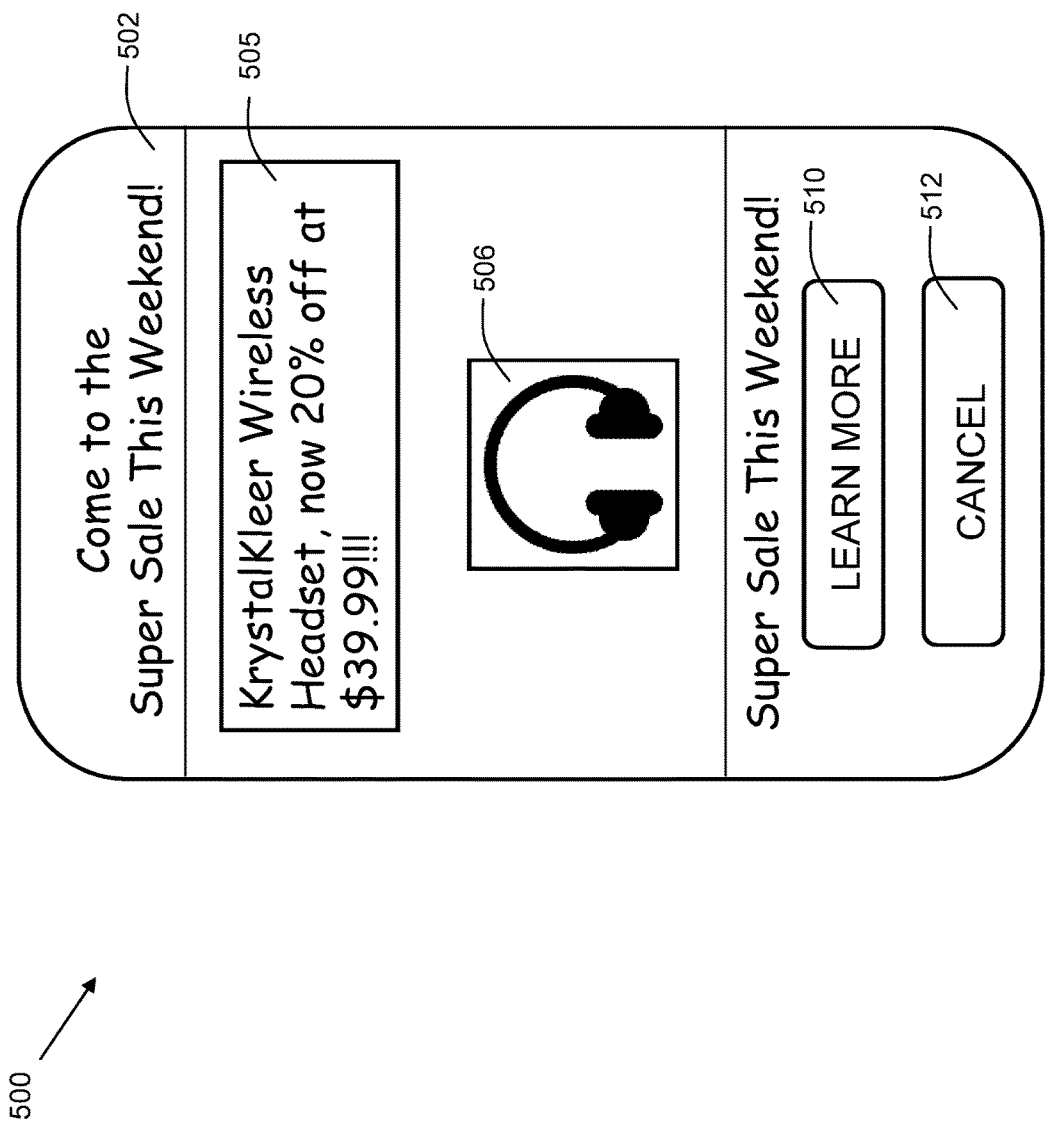
FIG. 5 shows an example of a first commerce message.

FIG. 5 shows an example 500 of a first commerce message displayed on a screen of an electronic device. The commerce message includes text 502 indicating a sale this weekend. The text includes a call to action ("Come to the . . . ") and an exclamation point, classifying it as an assertive tone and sentiment. Text 505 provides further details about a particular item that is on sale. The text recites, "KrystalKleer Wireless Headset, now 20% off at $39.99!!!" An image 506 shows a picture, illustration, etc., of the item on sale.

In embodiments, it is determined whether the user responds to (i.e. acknowledges) the message. This may be by direct solicitation. In such an implementation, the electronic message includes a solicitation of a user response. In the example, at 510, the solicitation is embodied as an electronic button 510 which the user can press (on a touch-sensitive screen with a finger, a stylus, or using a mouse) to "learn more," a positive response. A positive response indicates that the user is aware of (i.e., has acknowledged) the message. Alternatively, the user can select button 512 for "cancel," which is also treated as an acknowledgement of the message, and thus may trigger a suppression of a future electronic message in accordance with embodiments of the present invention. Any mechanism for solicitation and response is included within the scope of the invention.

In another implementation, the determining (whether the user responds) may include analysis of a user-facing camera (such as camera 322 of FIG. 3) on the electronic device. For example, an app on the user's electronic device, having access to a user-facing camera of the electronic device, may analyze whether the user's face is detected in the user-facing camera simultaneously with the first commerce message being displayed on the screen. If yes, it may be inferred that the user has seen the first commerce message, which can be considered a positive response (i.e., the user is aware of the message). If not, it may be inferred that the user has not seen the first commerce message, which can accordingly be considered a negative response (i.e., the user is not aware of the message). Any method of soliciting and detecting a user's response/acknowledgement is included within the scope of the present invention.

Figure 6:
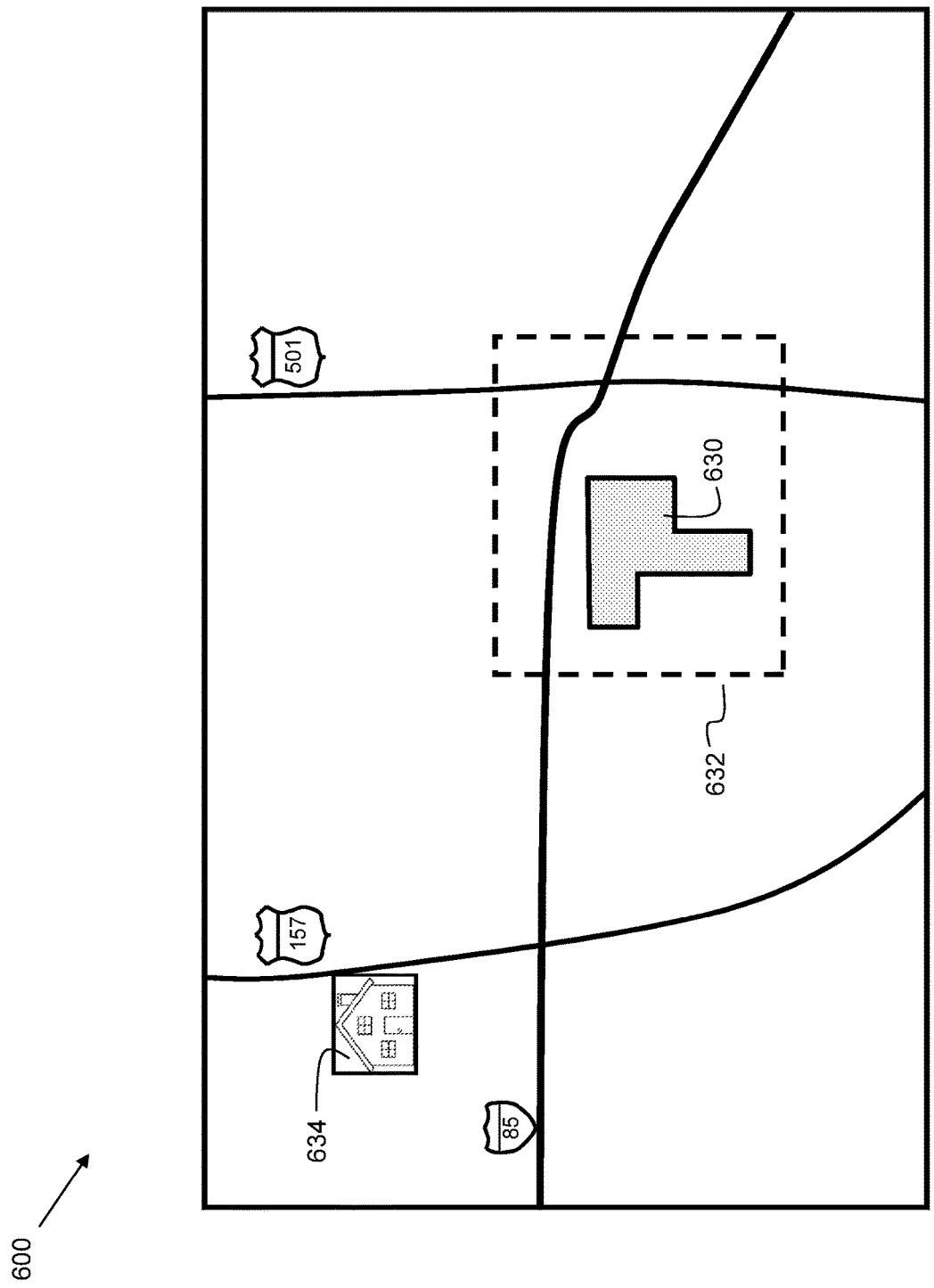
FIG. 6 shows an exemplary area that includes a venue.

FIG. 6 shows an exemplary area 600 that includes a venue. Exemplary area 600 is shown as a map. A user's home is shown at 634, and the venue is shown at 630. Venue 630 has a geofence 632 which surrounds it. In the example, a first commerce message (FIG. 5) is sent to the electronic device while the user is at home 634. The user reads the message, and responds, by pressing the electronic device's touch-sensitive screen to indicate "learn more" at 510 (FIG. 5).

In the case where a user responded to the message, a timer is activated. In a first example, the expiry duration of the timer is 48 hours. The user was interested in the sale advertised by the first commerce message, so he decides to go to the venue 630 to see the item. He arrives at the venue 40 hours after the first commerce message was acknowledged. He takes the electronic device with him to the venue. Accordingly, the electronic device interacts with geofence 632. Since 40 hours is less than the expiry duration of 48 hours, it is determined that the expiry duration has not expired. Accordingly, a second commerce message is suppressed, as a re-send of the original message may be annoying or frustrating to the user if sent too soon after the original message.

Suppression of the second commerce message may include sending a reminder notification, rather than re-sending the original message. The suppressed second electronic message may include content that is based on the first commerce message, but in a passive tone and sentiment instead of the assertive tone and sentiment of the first commerce message. System 226 (FIG. 2) may use natural language processing to establish the content for the second commerce message.

Figure 7:
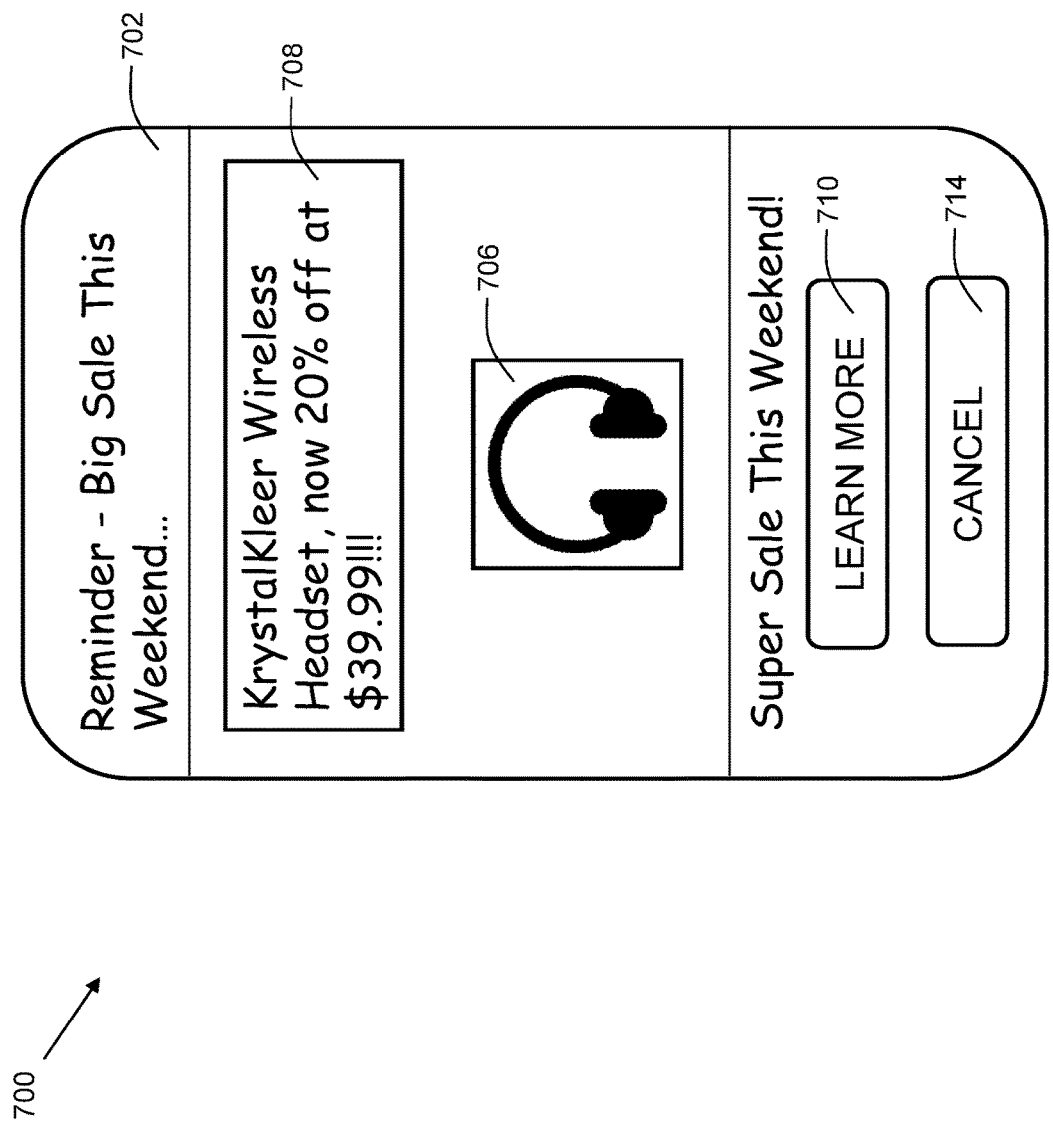
FIG. 7 shows an example of a second commerce message.

FIG. 7 shows an example 700 of a second commerce message, which is modified from the first commerce message. Second commerce message 700 is a reminder. Accordingly, its tone and sentiment is passive rather than assertive like the content of the first commerce message. In the example, at 702, text indicates that the second commerce message is a reminder about the big sale this weekend. At 708, there is text indicating further information about the sale as relates to a particular item. The text recites, "KrystalKleer Wireless Headset, now 20% off at $39.99!!!" At 706, an image of the item is shown.

In some embodiments, the second commerce message may be a "push" notification to an electronic device without requesting any acknowledgment from the user. In other embodiments, the message is "active," soliciting a response from the user. In the example, the solicitation is embodied as an electronic button 710 which the user can press (on a touch-sensitive screen with a finger, a stylus, or using a mouse) to "learn more," a positive response. A positive response indicates that the user is aware of the message. Alternatively, the user can select button 714 for "cancel," which is also treated as an acknowledgement of the message, and thus may trigger a suppression of a future electronic message in accordance with embodiments of the present invention.

In some embodiments, suppression of the second commerce message may include receiving and displaying a notification, but without including an audio or tactile notification. For example, many smartphones beep and/or vibrate when an SMS or email message is received. In some embodiments, suppression of the second commerce message includes suppressing an audio alert on the second commerce message. The audio alert may not be sounded, or may be sounded at a lower volume than regular messages being received at the electronic device. Thus, in some embodiments, the first commerce message has a first audio volume associated with it, and the second commerce message has a second audio volume associated with it, wherein the first audio volume is greater than the second audio volume.

In some embodiments, the suppressing of the first commerce message may include suppressing a vibration alert on the second commerce message. The vibratory alert may not be triggered, or may be actuated at a lower intensity (e.g., frequency) than the vibration associated with regular messages being received at the electronic device.

Figure 8:
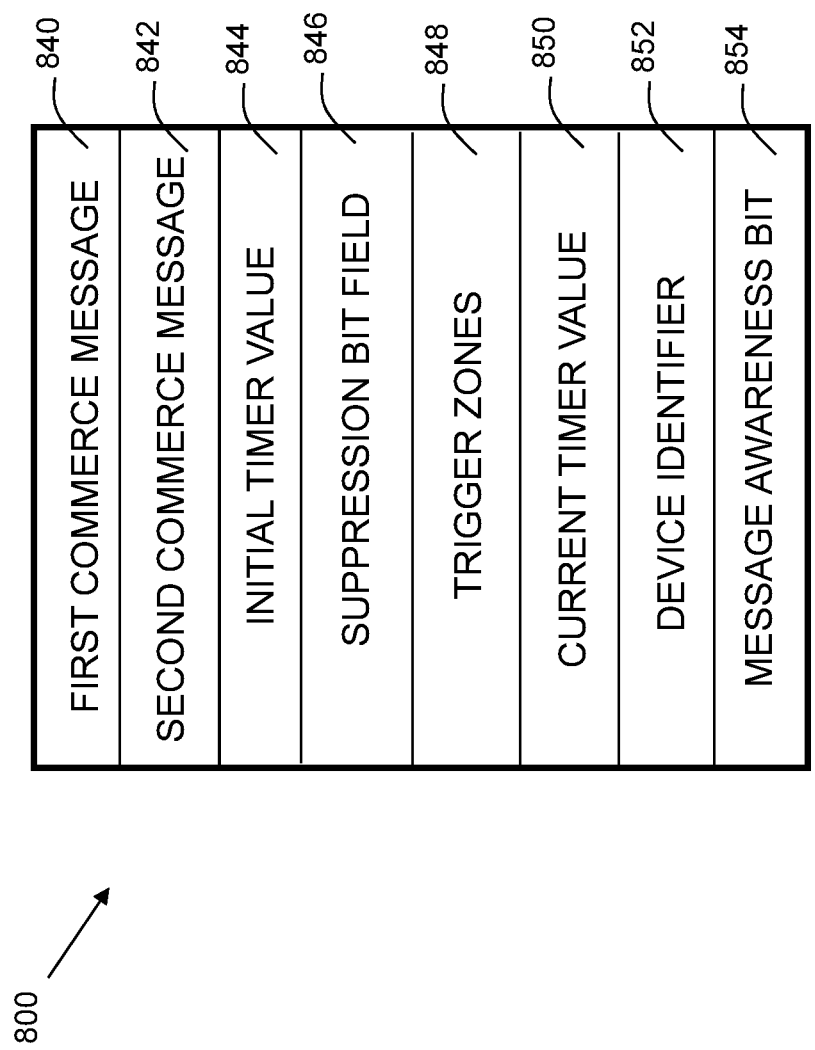
FIG. 8 shows a table including exemplary data fields in accordance with exemplary embodiments.

FIG. 8 shows a table 800 including exemplary data fields in accordance with exemplary embodiments. These tables and fields could be stored in a database on, or accessible to, the server 226 (FIG. 2).

Fields 840 and 842 store data relating to commerce messages. Field 840 may include data relating to a first commerce message. The data stored here may include text, images, videos, etc., for assembling a message having an assertive tone and sentiment. Field 842 may include data relating to a second commerce message, for example, a reminder notification. The data stored here may include text, images, videos, and any suitable content for assembling a message of a passive tone and sentiment. The tone and sentiment of a word, image, video, or other item of content may be assigned using tags. Machine learning and artificial intelligence may be applied to scan text, images, video, and other content to locate keywords, objects, faces, etc., and based on such, assign "assertive" or "passive." Items labeled as "assertive" are stored in data field 840, while items labeled as "passive" are stored in data field 842.

Field 844 stores an initial timer value. This is the predetermined expiry duration. In embodiments, the starting of the countdown of the timer is triggered by acknowledgement of the first commerce message.

Field 846 is the suppression bit field. Suppression bit field 846 may contain bits for indicating suppression of audio and/or vibration. When the bit is set to 0, this may indicate that the second commerce message is not to be suppressed. When the bit is set to 1, this may indicate that the second commerce message is to be suppressed. In embodiments, the bit field 846 may contain multiple bits for suppressing various attributes. For example, embodiments may suppress the beep (audible), or suppress the vibration (tactile) that would normally accompany a message. Thus, in some embodiments, the second message may still be sent, but if the timer has not yet expired, no audible and/or tactile indication is provided by the user's electronic mobile device upon receiving the second commerce message.

Field 848 stores data related to trigger zones. Trigger zones may include coordinates/regions where the user's device would be eligible to receive a commerce message. The message may be suppressed depending on the current timer value of field 850. The current timer value in field 850 begins counting down to zero once the timer is triggered.

Field 852 stores a device identifier. This is a unique identifier of a user's electronic device. This unique identifier may be an Ethernet MAC address, a Bluetooth address, or a UUID (from a Bluetooth Low Energy beacon), or any suitable identifier.

Field 854 stores a message awareness bit. This is an indicator that the user is aware of the message. Awareness means that there was a positive response to the message (i.e., the user was responsive/acknowledged the massage). If not, the bit is set to indicate a negative response (i.e., that the user is not aware of the message). In embodiments, when the bit is set to 0, this may indicate that the user is aware of the message. Similarly, when the bit is set to 1, this may indicate that the user is not aware of the message.

In some embodiments, more or fewer tables and/or fields may be included where feasible. In some embodiments, the database may be configured in a different structure than shown. All such configurations are included within the scope of the invention.

Embodiments of the present invention improve the technical field of electronic communication. Using techniques of disclosed embodiments, certain electronic messages are suppressed, enabling information to be disseminated in a timelier and efficient manner. The message suppression of disclosed embodiments improves utilization of network resources by automatically removing information that is likely to be unneeded, thereby making for a more improved use of computing resources. Embodiments of the present invention reduce the sending of notifications that are unnecessary or unwanted by the recipient. This results in a conservation of network resources, as well as reducing power consumption, memory usage, CPU usage etc., for both the sending computer system and the mobile device that receives such messages.

As can now be appreciated, disclosed embodiments provide techniques for suppression of commerce notifications based on user activity. In embodiments, the user activity is an activity such as an acknowledgement via an application (app) on an electronic mobile computing device that is associated with the user. For example, a user may receive a first commerce message including information regarding a sale at a retail venue. The user may, at that time, interact with the information by pressing a button or activating a link to obtain more information. That interaction is recorded and used as criteria for sending or suppressing a second commerce message. For example, if the user goes to the retail venue later the same day as receiving the first commerce message, the second commerce message may be suppressed. Alternatively, the second commerce message may be modified. The modification can include rewording the first commerce message as a reminder. The modification can include removal of audio and/or vibration alerts for the second commerce message. These features can promote a user experience in which the user is aware of a sale or promotion and the in-store experience remains positive, while reducing the risk of a user becoming inundated with notifications and annoyed.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for sending notifications to an electronic device comprising:
  sending a first message at a first time to the electronic device;
  responsive to the electronic device receiving the first message, starting a timer;
  detecting a location of the electronic device;
  responsive to detecting that the location where the electronic device is presently located is a venue associated with the first message and that the timer has expired, sending a second message to the electronic device; and
  responsive to detecting that the location that the electronic device is presently located is the venue associated with the first message and that the timer is active, suppressing the second message to the electronic device, such that the second message that is sent to the electronic device is a suppressed second message.

2. The method of claim 1, wherein sending the second message comprises sending message content identical to the first message.

3. The method of claim 1, wherein the second message that is sent to the electronic device is suppressed by sending message content modified based on the first message, such that a content of the second message has a passive tone.

4. The method of claim 3, wherein the first message includes a sale notice and wherein the second message includes a sale reminder.

5. The method of claim 1, wherein starting the timer includes starting the timer having an expiry duration ranging from three to five days.

6. The method of claim 1, further comprising suppressing an audio alert on the second message that is sent to the electronic device.

7. The method of claim 1, further comprising suppressing a vibration alert on the second message that is sent to the electronic device.

8. An electronic communication device comprising:
a processor;
a memory coupled to the processor, the memory containing instructions, that when executed by the processor, perform the steps of:
sending a first message at a first time to a mobile electronic device;
responsive to sending the first message, starting a timer;
detecting a location of the mobile electronic device;
responsive to detecting that the location where the electronic device is presently located is a venue associated with the first message and that the timer has expired, sending a second message to the mobile electronic device; and
responsive to detecting that the location that the electronic device is presently located is the venue associated with the first message and that the timer is active, suppressing the second message to the mobile electronic device, such that the second message that is sent to the electronic device is a suppressed second message.

9. The electronic communication device of claim 8, wherein the memory further comprises instructions, that when executed by the processor, perform the step of sending the second message that comprises message content identical to the first message.

10. The electronic communication device of claim 8, wherein the memory further comprises instructions, that when executed by the processor, perform the step of sending the second message that comprises message content modified based on the first message, such that a content of the second message has a passive tone.

11. The electronic communication device of claim 10, wherein the memory further comprises instructions, that when executed by the processor, perform the steps of:
sending the first message that includes a sale notice; and
sending the second message that includes a sale reminder.

12. The electronic communication device of claim 8, wherein the memory further comprises instructions, that when executed by the processor, perform the step of starting the timer with an expiry duration ranging from three to five days.

13. The electronic communication device of claim 8, wherein the memory further comprises instructions, that when executed by the processor, perform the step of suppressing an audio alert on the second message that is sent to the electronic device.

14. The electronic communication device of claim 8, wherein the memory further comprises instructions, that when executed by the processor, perform the step of suppressing a vibration alert on the second message that is sent to the electronic device.

15. A computer program product for sending notifications, for an electronic computing device comprising a computer readable storage device having program instructions embodied therewith, the program instructions executable by a processor to cause the electronic computing device to:
send a first message at a first time, wherein the first message solicits a user response;
responsive to receiving the user response, start a timer;
detect a location of a mobile electronic device;
responsive to detecting that the location where the electronic device is presently located is a venue associated with the first message and that to the timer has expired, send a second message to the mobile electronic device; and
responsive to detecting that the location that the electronic device is presently located is the venue associated with the first message and that the timer is active, suppressing the second message to the mobile electronic device, such that the second message that is sent to the electronic device is a suppressed second message.

16. The computer program product of claim 15, further comprising program instructions executable by the processor to cause the electronic computing device to send the second message comprising message content modified based on the first message, such that a content of the second message has a passive tone.

17. The computer program product of claim 15, further comprising program instructions executable by the processor to cause the electronic computing device to suppress an audio alert on the second message that is sent to the electronic device.

18. The computer program product of claim 15, further comprising program instructions executable by the processor to cause the electronic computing device to suppress a vibration alert on the second message that is sent to the electronic device.

* * * * *